United States Patent
Oshita et al.

(10) Patent No.: US 11,289,688 B2
(45) Date of Patent: *Mar. 29, 2022

(54) POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

(71) Applicant: SUMITOMO METAL MINING CO., LTD., Tokyo (JP)

(72) Inventors: Hiroko Oshita, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/952,597

(22) Filed: Nov. 19, 2020

(65) Prior Publication Data
US 2021/0074990 A1    Mar. 11, 2021

Related U.S. Application Data

(62) Division of application No. 15/754,747, filed as application No. PCT/JP2016/074842 on Aug. 25, 2016.

(30) Foreign Application Priority Data

Aug. 27, 2015    (JP) ................ 2015-167529

(51) Int. Cl.
*H01M 4/04*    (2006.01)
*H01M 4/131*    (2010.01)
(Continued)

(52) U.S. Cl.
CPC ........... *H01M 4/04* (2013.01); *H01M 4/131* (2013.01); *H01M 4/1391* (2013.01);
(Continued)

(58) Field of Classification Search
CPC ...... H01M 4/04; H01M 4/131; H01M 4/1391; H01M 4/525; H01M 10/0525; H01M 10/0568
See application file for complete search history.

(56) References Cited

U.S. PATENT DOCUMENTS

2005/0158625 A1   7/2005   Im et al.
2007/0231691 A1   10/2007  Abe et al.
(Continued)

FOREIGN PATENT DOCUMENTS

CN    1649193 A    8/2005
CN    103503207 A    1/2014
(Continued)

OTHER PUBLICATIONS

International Search Report dated Nov. 29, 2016, issued in Counterpart of International Application No. PCT/JP2016/074842(1 page).
(Continued)

*Primary Examiner* — Matthew J Merkling
(74) *Attorney, Agent, or Firm* — Westerman, Hattori, Daniels & Adrian, LLP

(57) ABSTRACT

A method for producing a positive electrode active material for nonaqueous electrolyte secondary batteries is disclosed which includes cleaning a powder formed of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al with an aqueous lithium carbonate solution and drying the cleaned powder.

3 Claims, 2 Drawing Sheets

(51) Int. Cl.
*H01M 4/1391* (2010.01)
*H01M 4/525* (2010.01)
*H01M 10/0525* (2010.01)
*H01M 10/0568* (2010.01)
*H01M 4/02* (2006.01)

(52) U.S. Cl.
CPC ....... *H01M 4/525* (2013.01); *H01M 10/0525* (2013.01); *H01M 10/0568* (2013.01); *H01M 2004/028* (2013.01); *H01M 2300/0051* (2013.01)

(56) References Cited

U.S. PATENT DOCUMENTS

| | | |
|---|---|---|
| 2011/0039160 A1 | 2/2011 | Takahata et al. |
| 2011/0177364 A1 | 7/2011 | Miyazaki et al. |
| 2013/0288085 A1 | 10/2013 | Morikawa et al. |
| 2014/0056797 A1 | 2/2014 | Kabe et al. |
| 2015/0162599 A1 | 6/2015 | Takei et al. |
| 2015/0194662 A1 | 7/2015 | Yang et al. |
| 2015/0228969 A1 | 8/2015 | Cho et al. |
| 2015/0280213 A1 | 10/2015 | Tanjo et al. |
| 2016/0293952 A1 | 10/2016 | Kaneda et al. |
| 2019/0214637 A1 | 7/2019 | Hirose et al. |

FOREIGN PATENT DOCUMENTS

| | | |
|---|---|---|
| CN | 104091942 A | 10/2014 |
| JP | 5-242891 A | 9/1993 |
| JP | 10-302779 A | 11/1998 |
| JP | 2002-203540 A | 7/2002 |
| JP | 2007-273108 A | 10/2007 |
| JP | 2010-64944 A | 3/2010 |
| JP | 2011-023120 A | 2/2011 |
| JP | 2011-23121 A | 2/2011 |
| JP | 2015-122299 A | 7/2015 |

OTHER PUBLICATIONS

International Preliminary Report on Patentability (Form PCT/IB/373) dated Feb. 27, 2018, issued in counterpart International Application No. PCT/JP2016/074842, with Form PCT/ISA/237; with English translation. (11 pages).

Office Action dated Jun. 18, 2019, issued in counterpart JP application No. 2015-167529, with English translation. (7 pages).

Office Action dated Jul. 9, 2020, issued in counterpart CN application No. 201680048964.0, with English translation. (15 pages).

US 11,289,688 B2

POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

CROSS-REFERENCE TO RELATED APPLICATION

This application is a divisional of U.S. patent application Ser. No. 15/754,747 filed on Feb. 23, 2018, which is a U.S. National Stage of International Application No. PCT/JP2016/074842 filed on Aug. 25, 2016, each of which claims benefit of Patent Application No. 2015-167529 filed in Japan on Aug. 27, 2015, the entire contents of which are hereby incorporated by reference.

TECHNICAL FIELD

The present invention relates to a method for producing a positive electrode active material for nonaqueous electrolyte secondary batteries, a production method thereof, and a nonaqueous electrolyte secondary battery.

BACKGROUND ART

With the recent wide spread use of portable electronic devices, such as mobile phones and notebook personal computers, there has been a strong demand to develop small, light nonaqueous electrolyte secondary batteries having high energy density. There has been also a demand to develop high-output, nonaqueous electrolyte secondary batteries serving as batteries for electric vehicles, including hybrid vehicles. Among nonaqueous electrolyte secondary batteries that satisfy these demands are lithium-ion secondary batteries. A lithium-ion secondary battery includes a negative electrode, a positive electrode, an electrolyte solution, and the like and uses materials capable of releasing and storing lithium ions as negative and positive electrode active materials.

At present, lithium-ion secondary batteries are actively being researched and developed. Among others, lithium-ion secondary batteries using a multilayer or spinel lithium-metal composite oxide as a positive electrode active material output 4V-class high voltages and therefore are being commercialized as batteries having high energy density. Among main lithium-metal composite oxides that have been proposed are lithium-cobalt composite oxides (e.g., $LiCoO_2$), which are synthesized relatively easily, lithium-nickel composite oxides (e.g., $LiNiO_2$), which use nickel, which is cheaper than cobalt, lithium-nickel-cobalt-manganese composite oxides (e.g., $LiNi_{1/3}Co_{1/3}Mn_{1/3}O_2$), and lithium-manganese composite oxides (e.g., $LiMn_2O_4$).

To obtain excellent initial capacity characteristics or cycle characteristics, there have been developed many batteries using a lithium-cobalt composite oxide as a positive electrode active material, and various fruits have already been produced. However, a lithium-cobalt composite oxide uses a cobalt compound, which is expensive, as a raw-material. For this reason, the cost per unit capacity of a battery using a lithium-cobalt composite oxide is much higher than that of a nickel-hydrogen battery and significantly restricts the applicability thereof as a positive electrode active material. Accordingly, there is a high expectation that the cost of the positive electrode active material will be reduced with respect to not only small secondary batteries for use in portable devices but also large secondary batteries for power storage purposes or for use in electric vehicles or the like and thus cheaper lithium-ion secondary batteries will be produced. The fulfillment of such an expectation can be said to be industrially significant.

A lithium-nickel composite oxide using nickel, which is cheaper than cobalt, exhibits lower electrochemical potential than a lithium-cobalt composite oxide and is less likely to be affected by the oxidative decomposition of an electrolyte solution. For this reason, lithium-ion secondary batteries using a lithium-nickel composite oxide are expected to have higher capacities. Also, such lithium-ion secondary batteries exhibit high battery voltages, as with cobalt-based lithium-ion secondary batteries, and therefore are actively being developed. However, if a lithium-ion secondary battery is produced using a lithium-nickel composite oxide synthesized from lithium and only nickel as a positive electrode active material, it disadvantageously exhibits poor cycle characteristics and is more likely to impair battery performance due to the use or storage in a high-temperature environment compared to a cobalt-based lithium-ion secondary battery. As a lithium-nickel composite oxide to overcome these disadvantages, there is commonly known a lithium-nickel composite oxide where nickel is partially substituted by cobalt or aluminum, for example, as disclosed in Patent Literature 1.

As a common method to produce a lithium-nickel composite oxide serving as a positive electrode active material, there is known a lithium-nickel composite oxide production method involving preparing a nickel composite hydroxide serving as a precursor by neutralization-crystallization, mixing the precursor and a lithium compound such as lithium hydroxide, and firing the mixture. However, a lithium-nickel composite oxide synthesized using this method still contains unreacted lithium hydroxide, lithium carbonate formed due to the carbonation of unreacted lithium hydroxide, lithium sulfate formed from raw material-derived impurities, and the like.

The unreacted lithium hydroxide may gel a positive electrode mixture material paste obtained by kneading the positive electrode active material. The unreacted lithium hydroxide may also be oxidatively decomposed to generate a gas if the positive electrode active material is charged in a high-temperature environment. On the other hand, the lithium sulfate formed from raw material-derived impurities does not contribute to charge/discharge reaction. Accordingly, when producing a battery, an unnecessary negative electrode material in an amount equivalent to the irreversible capacity of the positive electrode active material must be used in the battery. As a result, the capacity per unit weight and per unit volume of the entire battery is reduced. Also, the unnecessary lithium accumulated in the negative electrode as an irreversible capacity is problematic in terms of safety.

In view of the foregoing, Patent Literature 2 proposes a method of removing lithium hydroxide, lithium sulfate, and the like (hereafter collectively referred to as "lithium salt") from a synthesized lithium-nickel composite oxide by adding natural water to the lithium-nickel composite oxide and stirring the resulting composite oxide.

Patent Literature 3 proposes a method of increasing the storage characteristics of a synthesized lithium-nickel composite oxide in a high-temperature environment by carbonating lithium hydroxide remaining in the lithium-nickel composite oxide into lithium carbonate by gas-treating the lithium-nickel composite oxide in an atmosphere having a $CO_2$ concentration of 0.1% by volume or more and a dew point of $-15°$ C. or less at an atmosphere temperature of $150°$ C. or less.

CITATION LIST

Patent Literature

[Patent Literature 1] Japanese Unexamined Patent Application Publication No. Hei 05-242891
[Patent Literature 2] Japanese Unexamined Patent Application Publication No. 2007-273108
[Patent Literature 3] Japanese Unexamined Patent Application Publication No. Hei 10-302779

SUMMARY OF THE INVENTION

Technical Problem

However, with respect to the method disclosed in Patent Literature 2, when cleaning the lithium-nickel composite oxide, which will serve as a positive electrode active material, lithium ions near the surface thereof are lost, resulting in a reduction in the weather resistance. Thus, when handling a battery using such a positive electrode active material in an air atmosphere containing normal moisture and carbon dioxide, lithium ions are disadvantageously pulled out of the crystals, resulting in a reduction in the capacity. The method disclosed in Patent Literature 3 has difficulty in sufficiently removing unreacted lithium hydroxide. Also, Patent Literature 3 does not mention the removal of lithium sulfate.

In view of the above problems, an object of the present invention is to provide a positive electrode active material for nonaqueous electrolyte secondary batteries that suppresses the gelling of a positive electrode mixture material paste and has high weather resistance.

Solution to Problem

To solve those problems, the present inventors conducted intensive research on lithium-metal composite oxides used as positive electrode active materials for nonaqueous electrolyte secondary batteries and production methods thereof. As a result, the present inventors found that by cleaning a powder formed of a lithium-nickel composite oxide with an aqueous lithium carbonate solution to remove excess lithium salt, as well as by leaving a part of the cleaning solution as lithium carbonate, there is obtained a positive electrode active material which suppresses the gelling of a kneaded positive electrode mixture material paste and has high weather resistance while maintaining an initial capacity equivalent to a conventional one, and then completed the present invention.

A first aspect of the present invention provides a method for producing a positive electrode active material for nonaqueous electrolyte secondary batteries. The method includes cleaning a powder formed of a lithium-nickel composite oxide represented by a general formula $Li_zNi_{1-x-y}Co_xM_yO_2$ where $0 \geq x \leq 0.35$; $0 \leq y \leq 0.10$; $0.95 \leq z \leq 1.10$; and M is at least one element selected from Mn, V, Mg, Mo, Nb, Ti, and Al with an aqueous lithium carbonate solution and drying the cleaned powder.

A concentration of the aqueous lithium carbonate solution is preferably 0.5 g/L or more and 16.0 g/L or less. The cleaning preferably includes cleaning the powder in a state in which a concentration of a slurry of the aqueous lithium carbonate solution containing the powder is 100 g/L or more and 3000 g/L or less.

A second aspect of the present invention provides a positive electrode active material for nonaqueous electrolyte secondary batteries. The positive electrode active material includes a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al and has a lithium carbonate content of 0.4% by mass or more and 1.5% by mass or less, a lithium hydroxide content of 0.5% by mass or less, and a sulfate group content of 0.05% by mass or less.

A third aspect of the present invention provides a nonaqueous electrolyte secondary battery having the above positive electrode active material for nonaqueous electrolyte secondary batteries in a positive electrode.

Advantageous Effects of the Invention

According to the positive electrode active material of the present invention, it is possible to obtain a positive electrode active material for nonaqueous electrolyte secondary batteries that suppresses the gelling of a positive electrode mixture material paste and has high weather resistance. Also, the production method of the present invention allows this positive electrode active material to be easily produced and is suitable particularly to industrial mass production. For this reason, the production method is extremely industrially valuable.

DESCRIPTION OF EMBODIMENTS

Figure 1:
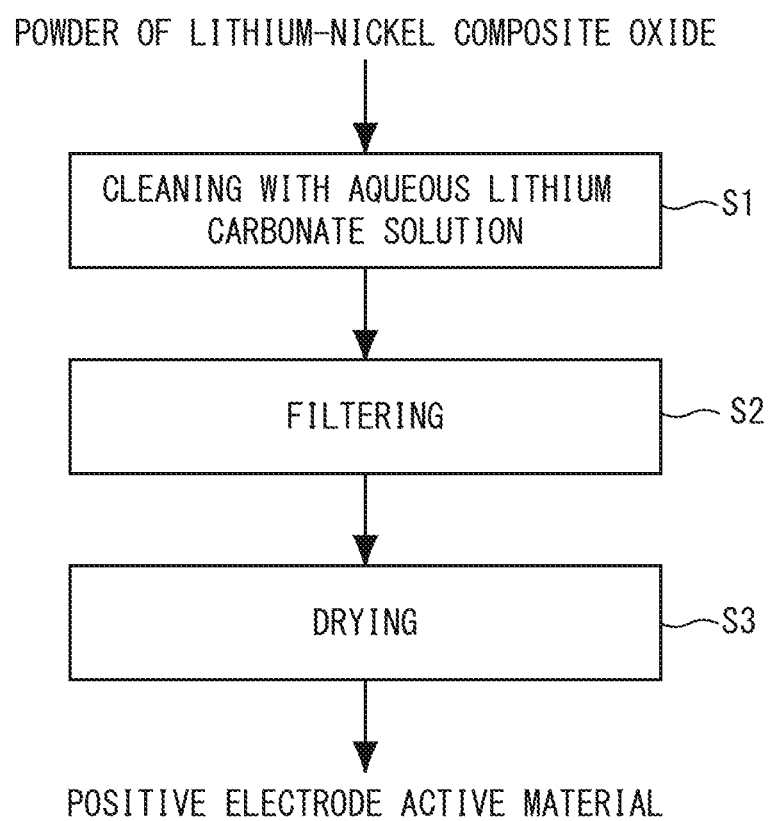
FIG. 1 is a flowchart showing an example of a method for producing a positive electrode active material for nonaqueous electrolyte secondary batteries according to the present embodiment.
Figure 2:
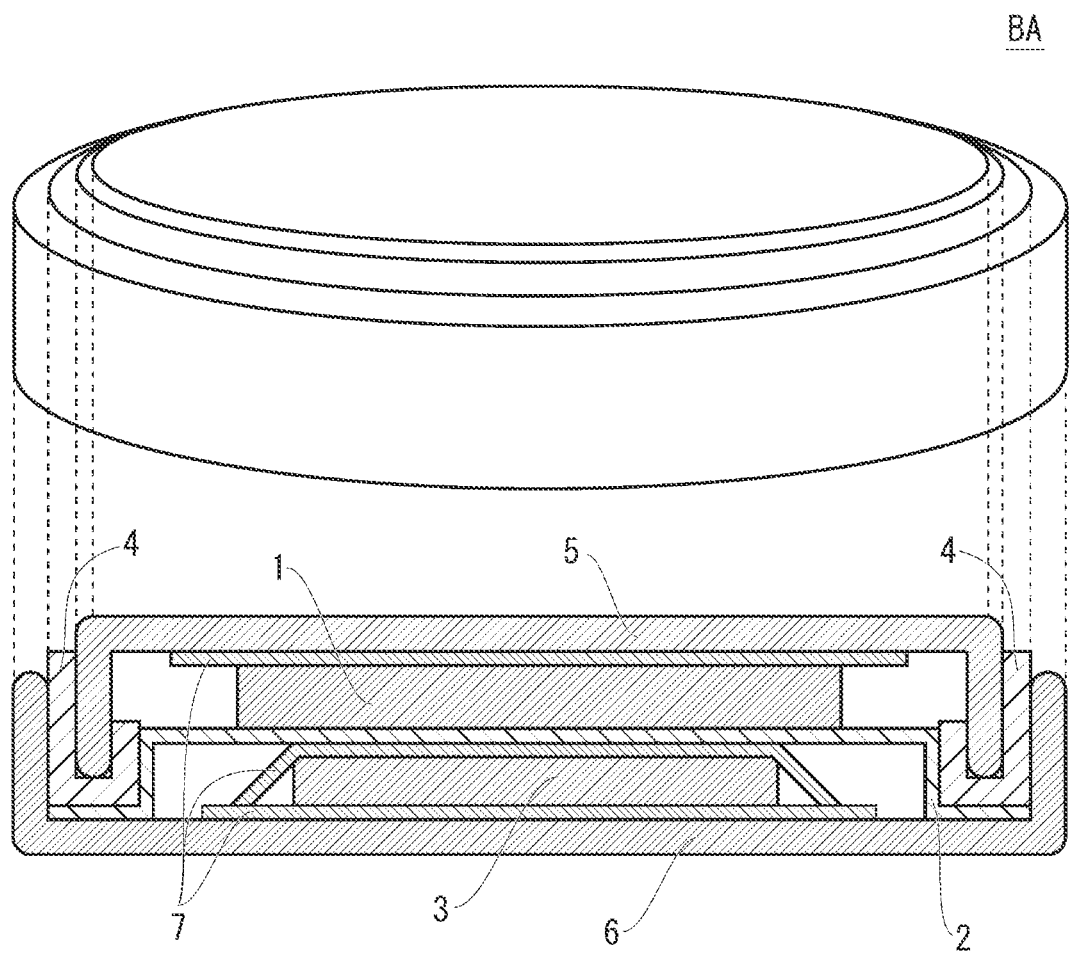
FIG. 2 is a schematic sectional view of a coin battery 1 used to evaluate a battery.

1. Method for Producing Positive Electrode Active Material for Nonaqueous Electrolyte Secondary Batteries Now, one example embodiment of the present invention will be described with reference to the accompanying drawings. FIG. 1 is a flowchart showing a method for producing a positive electrode active material for nonaqueous electrolyte secondary batteries according to the present embodiment. The production method described below is illustrative only and does not limit the production method of the present invention.

As shown in FIG. 1, a powder formed of a lithium-nickel composite oxide is cleaned with an aqueous lithium carbonate solution (step S1). Specifically, first, a powder formed of a lithium-nickel composite oxide (also simply referred to as "powder") is prepared as a base material. The lithium-nickel composite oxide is represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al.

The method for producing the powder is not limited to any particular method and may be a known method. Examples thereof include a method involving mixing a compound containing lithium and a compound containing a metal other than lithium (a transition metal such as nickel or cobalt, aluminum, etc.) and firing the mixture, a method involving spray-pyrolyzing an aqueous solution containing lithium and a metal other than lithium, and a method involving mixing a hydroxide containing a metal other than lithium obtained by neutralization-crystallization and a lithium compound and firing the mixture. By employing the method using a hydroxide containing a metal other than lithium obtained by neutralization-crystallization described above or a method using an oxide obtained by heat-treating the hydroxide, it is possible to easily control the specific surface area or the like of a powder to be obtained within a desired range. The production method of the present embodiment is suitable for cases in which the raw-materials of the powder are sulfate, carbonate, hydroxide, and the like and substances derived from these raw-materials remain in the powder.

The powder is cleaned, for example, by dispersing, stirring, and slurrying the powder in an aqueous lithium carbonate solution. This allows for the removal of lithium sulfate, lithium hydroxide, or the like on the surface of the particles of the lithium-nickel composite oxide forming the powder, as well as allows for the substitution of lithium hydroxide by lithium carbonate. By cleaning the powder with the aqueous lithium carbonate solution, there is obtained a positive electrode active material that suppresses the gelling of a positive electrode mixture material paste and has high weather resistance while maintaining an initial capacity equal to or greater than that of a conventional production method.

The aqueous lithium carbonate solution is prepared, for example, by dissolving lithium carbonate in water. The aqueous lithium carbonate solution may have any concentration as long as lithium carbonate is soluble to water. The concentration of the aqueous lithium carbonate solution is, for example, 0.5 g/L or more and 16.0 g/L or less. If the concentration is less than 0.5 g/L, an expected effect may not be obtained even if a part of lithium hydroxide is left as lithium carbonate; if the concentration is more than 16.0 g/L, the aqueous lithium carbonate solution may be difficult to adjust, since such a concentration is close to the supersaturation concentration of lithium carbonate. The lower limit of the concentration of the aqueous lithium carbonate solution is preferably 1.0 g/L or more, more preferably 5.0 g/L or more, even more preferably 7.0 g/L or more. If the lower limit of the concentration falls within the above range, it is possible to more effectively adjust the lithium carbonate content or the like of the positive electrode active material to within a desired range and thus to obtain higher weather resistance. The upper limit of the concentration of the aqueous lithium carbonate solution is preferably 15.0 g/L or less. If the upper limit of the concentration falls within this range, it is possible to obtain higher weather resistance. Note that a part of lithium carbonate in the aqueous lithium carbonate solution may be caused to react with carbon dioxide to form lithium hydrogencarbonate.

The aqueous lithium carbonate solution containing the powder may have any slurry concentration as long as the powder is uniformly dispersed in the aqueous lithium carbonate solution. The slurry concentration is, for example, 100 g/L or more and 3000 g/L or less. The unit of the slurry concentration, g/L, means the amount (g) of powder with respect to the amount (L) of aqueous lithium carbonate solution in the slurry. If the slurry concentration falls within the above range, the amount of powder contained in the slurry is increased as the slurry concentration is increased, allowing for the treatment of a larger amount of powder. The lower limit of the slurry concentration is preferably 200 g/L or more, more preferably 500 g/L or more. If the lower limit of the slurry concentration falls within the above range, it is possible to more efficiently reduce the lithium hydroxide content and increase the lithium carbonate content. The upper limit of the slurry concentration is preferably 2500 g/L or less, more preferably 2000 g/L or less. If the upper limit of the slurry concentration falls within the above range, the viscosity of the slurry falls within an appropriate range. Thus, it is possible to more uniformly stir the slurry and thus to more efficiently remove lithium sulfate or lithium hydroxide.

Any other cleaning condition may be set in addition to those described above. An adjustment may be made as appropriate so that lithium hydroxide or sulfate group remaining in the powder is sufficiently removed and the lithium carbonate content falls within a desired range. For example, the time during which the aqueous lithium carbonate solution containing the powder is stirred may be set to about 5 min to 1 h. Also, the cleaning temperature may be set to about 10° C. to 30° C.

During cleaning, lithium in the powder may is eluted into the slurry. For this reason, the atomic ratio of Li in the powder may vary between before and after cleaning. Li is one of main elements whose atomic ratios may vary due to cleaning, and the atomic ratios of the metals other than Li before cleaning are maintained even after cleaning. The atomic ratio of Li reduced due to the above cleaning is, for example, about 0.03 to 0.08. The atomic ratio value of Li reduced when cleaning the powder with the aqueous lithium carbonate solution tends to be smaller than that when cleaning the powder with normal water, that is, the reduction in Li tends to be smaller. The atomic ratio of Li after cleaning is able to be controlled by previously checking the amount of reduction in the atomic ratio of Li between before and after cleaning by performing a preliminary test on the same cleaning conditions and then using a lithium-metal composite oxide powder where the atomic ratio of Li serving as a base material has been adjusted.

After cleaning the powder with the aqueous lithium carbonate solution, the slurry containing the powder is filtered, as shown in FIG. 1 (step S2). The powder may be filtered using any method. For example, a commonly used filter such as a suction filter, filter press, or centrifuge may be used. By filtering the powder, it is possible to reduce the amount of water that adheres to the surface of the powder when solid-liquid separating the slurry. If a large amount of water adheres, lithium salt dissolved in the solution may be reprecipitated, and the amount of lithium on the surface of the lithium-nickel composite oxide particles after being dried may fall outside an expected range. Note that step S2 is performed optionally. If step 2S is not performed, the adhering water may be removed, for example, by leaving the slurry to stand or centrifuging it to remove a supernatant substance.

Then, the filtered powder is dried, as shown in FIG. 1 (step S3). The powder may be dried at any temperature as long as moisture contained in the powder is sufficiently removed. The drying temperature is preferably, for example, 80° C. or more and 350° C. or less. If the drying temperature is below 80° C., the drying of the cleaned powder is slowed. Thus, the lithium concentration may be inclined between the surface and inside of the powder, resulting in the production of a positive electrode active material having low battery characteristics. On the other hand, if the drying temperature is above 350° C., the crystal structure around the powder surface may collapse, resulting in the production of a positive electrode active material having low battery characteristics. The reason seems that the crystal structure around the surface of the cleaned powder is extremely close to a stoichiometric ratio, or close to a charged state due to the release of a slight amount of lithium and thus is more likely to collapse.

The powder may be dried for any duration of time, but is preferably dried for a duration of time such that the moisture content of the dried powder becomes 0.2% by weight or less, preferably 0.1% by weight or less, more preferably 0.05% by weight or less. The drying time is, for example, 1 h or more and 24 h or less. The moisture content of the powder is able to be measured at a vaporization temperature of 300° C. using a Karl Fischer moisture meter.

The powder is preferably dried in a gas atmosphere that does not contain a compound component containing carbon and sulfur, or in a vacuum atmosphere. The amounts of carbon and sulfur in the powder are able to be easily controlled by cleaning (step S1). If the powder is dried in an atmosphere that contains a compound component containing carbon and sulfur or in a vacuum atmosphere in step S3, the amounts of carbon and sulfur in the powder may vary and an expected effect may not be obtained.

Note that step S2 may be skipped, that is, the powder may be dried (step S3) directly after being cleaned (step S1) as long as the amounts of carbon and sulfur in the powder are able to be controlled in a range described below. After being dried (step S3), the powder is able to be used as the material of a positive electrode mixture material paste serving as a positive electrode active material. Or, after being dried (step S3), the powder may be pulverized and then used as the material of a positive electrode mixture material paste serving as a positive electrode active material.

2. Positive Electrode Active Material for Nonaqueous Electrolyte Secondary Batteries A positive electrode active material for nonaqueous electrolyte secondary batteries of the present embodiment is formed of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al. The positive electrode active material has a lithium carbonate content of 0.4% by mass or more and 1.5% by mass or less, a lithium hydroxide content of 0.5% by mass or less, and a sulfate group content of 0.1% by mass or less. An example embodiment of the positive electrode active material will be described below.

Composition

In the general formula, z represents the element ratio of Li to the metal elements (Ni, Co, and M) other than Li in the lithium-nickel composite oxide when the metal elements are 1. The range of z is $0.95 \leq z \leq 1.10$. If z is less than 0.95, the reaction resistance of the positive electrode may be increased, and the battery output may be reduced; if z is more than 1.10, a secondary battery having lower safety may be produced. In terms of the balance between the battery output and the safety, the range of z is preferably $0.97 \leq z \leq 1.05$, more preferably $0.97 \leq z \leq 1.00$. If z falls within the above range, the battery output and the safety of a secondary battery containing this positive electrode active material are well balanced. As described above, when a powder formed of the lithium-nickel composite oxide is cleaned as a base material, Li may be eluted from the powder. For this reason, the amount of Li reduced by cleaning is checked through a preliminary test, and a yet-to-be-cleaned powder is prepared such that the element ratio of cleaned Li falls within the above range. This allows the atomic ratio of Li to fall within the above range.

In the general formula, x represents the element ratio of Co to the metal elements (Ni, Co, and M) other than Li when the metal elements are 1. The range of x is $0 \leq x \leq 0.35$, preferably $0 \leq x \leq 0.35$. The inclusion of cobalt in the positive electrode active material allows good cycle characteristics to be obtained. The reason is that the substitution of a part of the crystal lattice of nickel by cobalt allows for a reduction in the expansion/contraction behavior of the crystal lattice caused by the release or storage of lithium associated with a charge or discharge.

In order to improve the cycle characteristics of secondary batteries, the range of x is preferably $0.03 \leq x \leq 0.35$, more preferably $0.05 \leq x \leq 0.3$. Also, in terms of the capacity of secondary batteries, the range of x is preferably $0.03 \leq x \leq 0.15$, more preferably $0.05 \leq x \leq 0.10$. If importance is given to thermal stability, the range of x is preferably $0.07 \leq x \leq 0.25$, more preferably $0.10 \leq x \leq 0.20$.

In the general formula, y represents the element ratio of M (additional element) to the metal elements (Ni, Co, and M) other than Li when the metal elements are 1. M is at least one element selected from Mn, V, Mg, Mo, Nb, Ti, and Al. The range of y is $0 \leq y \leq 0.10$, preferably $0 \leq y \leq 0.10$ meaning that M is necessarily contained. The addition of M to the positive electrode active material allows for an improvement in the durability or safety of a secondary battery containing the resulting positive electrode active material. However, if y is more than 0.10, metal elements conducive to oxidation-reduction reaction (Redox reaction) are undesirably reduced, resulting in a reduction in the battery capacity. If M is aluminum, the safety of the positive electrode active material is further improved.

In the general formula, the element ratio of nickel to the metal elements (Ni, Co, and M) other than Li is 0.55 or more and 1 or less when the metal elements are 1. An adjustment of the mixing ratio among the raw-materials including Li, Ni, Co, and M allows the element ratios of the metal elements in the lithium-nickel composite oxide to fall within the above ranges.

Lithium Carbonate Content

The positive electrode active material of the present embodiment has a lithium carbonate content of 0.4% by mass or more and 1.5% by mass or less. If the lithium carbonate content falls within the above range, the deterioration of the surface of the lithium-nickel composite oxide is prevented, resulting in the production of a positive electrode active material having high weather resistance. If the lithium carbonate content is less than 0.4% by mass, there is reduced the effect of preventing the deterioration of the surface of the lithium-nickel composite oxide, failing to produce a positive electrode active material having sufficient weather resistance. On the other hand, if the lithium carbonate content is more than 1.5% by mass, battery characteristics are degraded when the positive electrode active material is charged in a high-temperature environment. For example, lithium carbonate is decomposed, generating a gas.

The lithium carbonate contained in the positive electrode active material includes that generated when lithium hydroxide remaining in the positive electrode active material is carbonated by carbon dioxide in the air and that derived from the aqueous lithium carbonate solution used in the above cleaning. The lower limit of the lithium carbonate content is preferably 0.45% by mass or more, more preferably 0.55% by mass or more. The upper limit of the lithium carbonate content is preferably 1.0% by mass or less. If the lithium carbonate content falls within the above range, a positive electrode active material having higher weather resistance is able to be obtained. The lithium carbonate content is a value obtained by measuring total carbon (TC) in the positive electrode active material using a carbon-sulfur analyzer (CS-600 available from LECO JAPAN CORPORATION) and converting the measured total carbon (TC) content into $LiCO_3$. The presence of lithium carbonate (LiCO$_3$) is able to be confirmed on the basis of the presence of a diffraction peak in X-ray diffraction measurement.

Sulfate Group Content

The positive electrode active material of the present embodiment has a sulfate group content of 0.05% by mass or less, preferably 0.025% by mass or less, more preferably 0.020% by mass or less. If a battery is produced using a positive electrode active material having a sulfate group content of more than 0.05% by mass, an unnecessary negative electrode material in an amount equivalent to the irreversible capacity of the positive electrode active material must be used in the battery. As a result, the capacity per unit weight and per unit volume of the entire battery is reduced. Further, excess lithium accumulated in the negative electrode as the irreversible capacity is problematic and undesirable in terms of safety. The lower limit of the sulfate group content of the positive electrode active material may be any percentage and is, for example, 0.001% by mass or more.

The sulfate group contained in the positive electrode active material mainly includes lithium carbonate generated from impurities derived from the raw-materials. The sulfate group content is able to be obtained by converting the amount of S (sulfur element) measured using an IPC emission spectrometer into the amount of SO$_4$.

Lithium Hydroxide Content

The positive electrode active material of the present embodiment has a lithium hydroxide content of 0.05% by mass or less, preferably 0.3% by mass or less, more preferably 0.2% by mass or less. If the lithium hydroxide content of the positive electrode active material is more than 0.5% by mass, a paste obtained by kneading the positive electrode active material may be gelled. Also, if such a positive electrode active material is charged in a high-temperature environment, lithium hydroxide may be oxidatively decomposed, generating a gas. The lower limit of the lithium hydroxide content of the positive electrode active material may be any percentage and is, for example, 0.01% by mass or more.

Lithium hydroxide contained in the positive electrode active material includes lithium hydroxide derived from the raw-materials used when producing the positive electrode active material. The raw material-derived lithium hydroxide is, for example, unreacted substances left after mixing a nickel composite hydroxide, nickel composite oxide, or the like and a lithium compound such as lithium hydroxide and then firing the mixture. The lithium hydroxide content is a value obtained by adding pure water to the obtained positive electrode active material, stirring the resulting positive electrode active material, then measuring the amount of lithium (Li) eluted into the pure water, by neutralization titration using 1 mol/liter of hydrochloric acid, then subtracting the amount of LiCO$_3$-derived lithium (Li) obtained using the above method from the amount of the eluted lithium (Li), defining the obtained value as the amount of lithium hydroxide-derived lithium (Li), and converting the amount into LiOH.

Average Particle Diameter

The positive electrode active material of the present embodiment may have any average particle diameter. However, if the average particle diameter is, for example, 3 μm or more and 25 μm or less, it is possible to increase the battery capacity per unit volume of the positive electrode active material and to obtain a secondary battery having high safety and good cycle characteristics. The average particle diameter is the value of a volume average particle diameter MV obtained from a volume integrated value measured using a laser diffraction particle size analyzer.

Specific Surface Area

The positive electrode active material of the present embodiment may have any specific surface area. However, if the specific surface area is, for example, 1.0 m$^2$/g or more and 7.0 m$^2$/g or less, a particle surface having a sufficient area is able to contact the electrolyte solution. If the specific surface area is less than 1.0 m$^2$/g, the area of the particle surface capable of contacting the electrolyte solution may be reduced, failing to obtain a sufficient charge/discharge capacity; if the specific surface area is more than 7.0 m$^2$/g, the area of the particle surface capable of contacting the electrolyte solution may be excessively increased, resulting in a reduction in safety. The specific surface area is a value measured by a specific surface area measurement instrument using the BET method, which uses nitrogen gas adsorption.

By using the positive electrode active material production method described above, the positive electrode active material of the present embodiment is able to be easily mass produced in an industrial scale.

3. Nonaqueous Electrolyte Secondary Battery

A nonaqueous electrolyte secondary battery of the present embodiment has the above positive electrode active material in a positive electrode. As with a typical nonaqueous electrolyte secondary battery, the nonaqueous electrolyte secondary battery of the present embodiment includes the positive electrode, a negative electrode, a separator, and a nonaqueous electrolyte solution. The elements, shape, and configuration of the nonaqueous electrolyte secondary battery of the present embodiment will be described in detail.

Positive Electrode

A positive electrode mixture material forming the positive electrode and materials contained in the mixture material will be described. A positive electrode mixture material paste is prepared by mixing a powdery positive electrode active material of the present invention, a conductive material, and a binder, optionally adding activated carbon or a solvent for viscosity adjustment or other purposes, and kneading the mixture. The mixing ratio among the materials contained in the positive electrode mixture material also serves as an important factor that determines the performance of a lithium secondary battery.

The materials of the positive electrode mixture material may be mixed at any ratio. However, as with those of the positive electrode of a typical lithium secondary battery, the contents of the materials with respect to the total mass of the solid content of 100% of the positive electrode mixture material except for the solvent are preferably as follows: the content of the positive electrode active material is 60% by mass or more and 95% by mass or less; the content of the conductive material is 1% by mass or more and 20% by mass or less; and the content of the binder is 1% by mass or more and 20% by mass or less.

The prepared positive electrode mixture material paste is applied to, for example, a surface of a collector formed of an aluminum foil and dried to scatter (vaporize) the solvent. Optionally, the applied positive electrode mixture material paste may be pressed using a roll press or the like to increase the electrode density. In this way, a sheet-shaped positive electrode is able to be produced. The sheet-shaped positive electrode is able to be used to produce the target battery, for example, by cutting it into a size suitable for the battery. Note that the method for producing the positive electrode need not be that described above and may be any other method.

Examples of the conductive material used to produce the positive electrode include carbon black-based materials, such as graphite (natural graphite, artificial graphite, expanded graphite, etc.), acetylene black, and Ketjen black.

The binder has the function of binding active material particles together. Examples of the binder include fluorine-containing resins, such as polyvinylidene fluoride, polytetrafluoroethylene, ethylene propylene diene rubber, and fluororubber, and thermoplastic resins, such as styrene butadiene, cellulose-based resin, polyacrylic acid, polypropylene, and polyethylene.

Optionally, a solvent to disperse the positive electrode active material, conductive material, and activated carbon and to dissolve the binder may be added to the positive electrode mixture material. The additional solvent may be, for example, an organic solvent such as N-methyl-2-pyrrolidone. Also, activated carbon may be added to the positive electrode mixture material to increase the electric double layer capacity.

Negative Electrode

The negative electrode is formed by mixing a binder with metallic lithium, lithium alloy, or the like or a negative electrode active material capable of storing and releasing lithium ions, adding an appropriate solvent to the mixture to prepare a pasty negative electrode mixture material, applying the pasty negative electrode mixture material to a surface of a metal-foil collector formed of copper or the like, drying it, and optionally compressing the dried mixture material to increase the electrode density.

Examples of the negative electrode active material include natural graphite, artificial graphite, a fired body of an organic compound such as phenol resin, and a powder of a carbon material such as coke. As in the positive electrode, the negative electrode binder may be a fluorine-containing resin such as polyvinylidene fluoride. The solvent to disperse the active material and the binder may be an organic solvent such as N-methyl-2-pyrrolidone.

Separator

The separator is disposed so as to be sandwiched between the positive electrode and the negative electrode. The separator separates the positive electrode and negative electrode from each other and holds an electrolyte. It may be a thin, porous film formed of polyethylene, polypropylene, or the like.

Nonaqueous Electrolyte Solution

The nonaqueous electrolyte solution is prepared by dissolving lithium salt serving as a supporting electrolyte in an organic solvent. The organic solvent may be one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the supporting electrolyte include $LiPF_6$, $LiBF_4$, $LiClO_4$, $LiAsF_6$, $LiN(CF_3SO_2)_2$, and composite salts thereof. The nonaqueous electrolyte solution may contain a radical scavenger, a surfactant, a flame retardant, or the like.

Shape and Configuration of Battery

The lithium secondary battery according to the present embodiment may have any shape, including a cylindrical shape and a multilayer shape. No matter what shape the lithium secondary battery has, the positive electrode and the negative electrode are stacked with the separator therebetween to form an electrode body, and the electrode body is impregnated with the nonaqueous electrolyte solution. Collection leads or the like are used to connect a positive electrode collector and a positive electrode terminal leading to the outside and to connect a negative electrode collector and a negative electrode terminal leading to the outside. The lithium secondary battery thus configured is hermetically sealed in a battery case, thereby completing the battery.

EXAMPLES

Hereafter, the present invention will be described in more detail using Examples of the present invention and Comparative Examples. However, the present invention is not limited to these Examples. Examples and Comparative Examples were evaluated on the basis of the results of measurements performed using apparatuses and methods below.

Composition and Sulfate Group Content

In each of Examples and Comparative Examples, a powder formed of a lithium-nickel composite oxide used as a base material was dissolved in nitric acid and then the composition ratio among the components was measured using a ICP emission spectrophotometer (ICPS-8100 available from SHIMADZU CORPORATION). Also, the sulfate group content was obtained by measuring the sulfur (S) content by ICP emission spectrometry and converting the measured sulfur content into $SO_4$.

Lithium Carbonate Content

The lithium carbonate content was obtained by measuring the total carbon (TC) content using a carbon-sulfur analyzer (CS-600 available from LECO JAPAN CORPORATION) and converting the measured total carbon content into $Li_2CO_3$.

Lithium Hydroxide Content

To 10 g of the positive electrode active material powder obtained in each of Examples and Comparative Examples was added 100 ml of extra-pure water and stirred for 5 min and filtered. Then, the filtrate was titrated with 1 mol/liter of hydrochloric acid and measured until the second neutralization point is reached. The alkali component neutralized with the hydrochloric acid was defined as the amount of lithium (Li) derived from lithium hydroxide (LiOH) and lithium carbonate ($Li_2CO_3$). Also, the amount of lithium (Li) derived from lithium carbonate ($Li_2CO_3$) was calculated from the lithium carbonate content obtained using the above method. Then, the amount of Li derived from lithium carbonate ($Li_2CO_3$) was subtracted from the amount of Li derived from lithium hydroxide (LiOH) and lithium carbonate ($Li_2CO_3$); the obtained amount was defined as the amount of Li derived from lithium hydroxide (LiOH); and by converting this amount of Li into LiOH, the lithium hydroxide content was obtained.

Determination of Gelling of Paste

A paste was prepared by putting 20 g of the positive electrode active material obtained in each of Examples and Comparative Examples in a container along with 2.2 g of PVDF (model number KF polymer #1100 available from KUREHA CORPORATION) and 9.6 ml of NMP (available from Kanto Chemical Co., Inc.) and sufficiently mixing these materials using a kneader (product name Non-Bubbling Kneader, model number NBK-1 available from NISSEI Corporation) at a rotation speed of 2000 rpm for 10 min. The prepared paste was transferred to a glass bottle, which was then sealed tightly and then stored in a dry box at a temperature of 25° C. and a dew point of −40° C. The paste was left to stand for 24 h and then observed for fluidity. Of the pastes left to stand for 24 h in Examples and Comparative Examples, those whose fluidity did not change were evaluated as A; those whose fluidity remained but changed as B; and those that gelled as C.

Evaluation of Battery Characteristics (Weather Resistance Test)

(1) Production of Evaluation Coin Battery

Into 70% by mass of the positive electrode active material obtained in each of Examples and Comparative Examples were mixed 20% by mass of acetylene black and 10% by mass of PTFE. One hundred fifty mg of the mixture was extracted and formed into a pellet serving as a positive electrode. Used as a negative electrode was lithium metal. Used as an electrolyte solution was an equal amount mixed solution of ethylene carbonate (EC) and diethyl carbonate (DEC) using 1M of $LiClO_4$ as a supporting electrolyte (available from TOMIYAMA PURE CHEMICAL INDUSTRIES, Ltd.). A 2032-type evaluation coin battery BA as shown in FIG. 1 was produced in an Ar-atmosphere glove box in which the dew point was controlled to −80° C. The 2032-type evaluation coin battery BA included a lithium metal negative electrode 1 serving as a negative electrode, a separator 2 that was impregnated with an electrolyte solution, a positive electrode 3, a gasket 4, a negative electrode can 5, a positive electrode can 6, and a current collector 7.

(2) Measurement of Discharge Capacity

The coin battery was left to stand for 24 h. After the open circuit voltage (OCV) was stabilized, the coin battery was charged to a cutoff voltage of 4.3 V with the current density at the positive electrode being 0.5 mA/cm$^2$, and the then capacity was measured as the charge capacity. After a rest of 1 h, the battery was discharged to a cutoff voltage of 3.0 V, and the then capacity was measured as the initial discharge capacity.

(3) Measurement of Discharge Capacity Retention Rate

The positive electrode active material obtained in each of Examples and Comparative Examples was left to stand at a high temperature of 80° C. and a high relative humidity of 80% for 24 h. Then, a 2032-type evaluation coin battery was produced as described above, and the discharge capacity was measured as described above. The discharge capacity retention rate was calculated as a relative value when the initial discharge capacity of the positive electrode active material (control group) before being subjected to the weather resistance test is 100, and then evaluated.

Example 1

Using a known technology involving mixing an oxide powder containing nickel as a main component and lithium hydroxide and firing the mixture, a fired powder of a lithium-nickel composite oxide represented by $Li_{1.03}Ni_{0.88}Co_{0.09}Al_{0.03}O_2$ was prepared as a base material. This powder had an average particle diameter of 12.0 μm and a specific surface area of 1.2 m$^2$/g. The average particle diameter was measured using a laser diffraction particle size analyzer (Microtrac available from Nikkiso Co., Ltd.), and the specific surface area was evaluated using a specific surface area measurement instrument (Quantasorb QS-10 available from Yuasa Ionics Co.) and using the BET method, which uses nitrogen gas adsorption.

To the lithium-nickel composite oxide powder (base material) was added an aqueous lithium carbonate solution having a concentration of 10.0 g/L to prepare a slurry having a concentration of 750 g/L. The slurry was cleaned by stirring for 30 min. Then, the powder was filtered and extracted. The extracted powder was dried by maintaining it in a vacuum atmosphere at a temperature of 210° C. for 14 h, to obtain a positive electrode active material formed of the lithium-nickel composite oxide. The atomic ratio z of Li in the obtained positive electrode active material was measured as 0.992 using an ICP emission spectrophotometer. The production conditions and evaluation results of the obtained positive electrode active material are shown in Table 1.

Example 2

In Example 2, a positive electrode active material was obtained as in Example 1 except that a lithium-nickel composite oxide powder obtained using a known technology involving mixing and an oxide powder containing nickel as a main component and lithium hydroxide and firing the mixture and represented by $Li_{1.04}Ni_{0.72}Co_{0.25}Al_{0.03}O_2$ was used as a base material. The production conditions and evaluation results of the obtained positive electrode active material are shown in Table 1. This lithium-metal composite oxide powder had an average particle diameter of 12.1 μm and a specific surface area of 1.1 m$^2$/g.

Example 3

In Example 3, a positive electrode active material was obtained as in Example 1 except that a lithium-nickel composite oxide powder obtained using a known technology involving mixing an oxide powder containing nickel as a main component and lithium hydroxide and firing the mixture and represented by $Li_{1.02}Ni_{0.92}Co_{0.05}Al_{0.03}O_2$ was used as a base material. The production conditions and evaluation results of the obtained positive electrode active material are shown in Table 1. This lithium-metal composite oxide powder had an average particle diameter of 12.2 μm and a specific surface area of 1.3 m$^2$/g.

Example 4

In Example 4, a positive electrode active material was obtained as in Example 1 except that the concentration of an aqueous lithium carbonate solution was set to 0.7 g/L. The production conditions and evaluation results of the positive electrode active material are shown in Table 1.

Example 5

In Example 5, a positive electrode active material was obtained as in Example 1 except that the concentration of an aqueous lithium carbonate solution was set to 1.5 g/L. The production conditions and evaluation results of the positive electrode active material are shown in Table 1.

Example 6

In Example 6, a positive electrode active material was obtained as in Example 1 except that the concentration of an aqueous lithium carbonate solution was set to 5.0 g/L. The production conditions and evaluation results of the positive electrode active material are shown in Table 1.

Example 7

In Example 7, a positive electrode active material was obtained as in Example 1 except that the concentration of an aqueous lithium carbonate solution was set to 15.0 g/L. The production conditions and evaluation results of the positive electrode active material are shown in Table 1.

Example 8

In Example 8, a positive electrode active material was obtained as in Example 1 except that the concentration of an aqueous lithium carbonate solution was set to 16.0 g/L. The production conditions and evaluation results of the positive electrode active material are shown in Table 1.

Example 9

In Example 9, a positive electrode active material was obtained as in Example 1 except that the concentration of a slurry was set to 100 g/L. The production conditions and evaluation results of the positive electrode active material are shown in Table 1.

Example 10

In Example 10, a positive electrode active material was obtained as in Example 1 except that the concentration of a slurry was set to 375 g/L. The production conditions and evaluation results of the positive electrode active material are shown in Table 1.

Example 11

In Example 11, a positive electrode active material was obtained as in Example 1 except that the concentration of a slurry was set to 1500 g/L. The production conditions and evaluation results of the positive electrode active material are shown in Table 1.

Example 12

In Example 12, a positive electrode active material was obtained as in Example 1 except that the concentration of a slurry was set to 3000 g/L. The production conditions and evaluation results of the positive electrode active material are shown in Table 1.

Comparative Example 1

In Comparative Example 1, a positive electrode active material was obtained as in Example 1 except that a cleaning step using an aqueous lithium carbonate solution was not performed. The production conditions and evaluation results of the positive electrode active material are shown in Table 1.

Comparative Example 2

In Comparative Example 2, a positive electrode active material was obtained as in Example 1 except that pure water was used in place of an aqueous lithium carbonate solution. The production conditions and evaluation results of the positive electrode active material are shown in Table 1.

Comparative Example 3

In Comparative Example 3, a positive electrode active material was obtained as in Example 1 except that pure water was used in place of an aqueous lithium carbonate solution and the concentration of a slurry was set to 1500 g/L. The production conditions and evaluation results of the positive electrode active material are shown in Table 1.

TABLE 1

| | Cleaning conditions | | | | | | | | | | | (Weather resistance) |
| | $Li_zNi_{1-x-y}Co_xM_yO_2$ | | | | $Li_2CO_3$ Aqueous solution con- centration (g/L) | Slurry con- centration (g/L) | Atomic ratio of cleaned Li z | $Li_2CO_3$ Content (mass %) | LiOH Content (mass %) | $SO_4$ Content (mass %) | Gelling determin- ation | Initial discharge capacity (mAh/g) | Discharge capacity retention rate (%) |
| | Li z | Ni 1-x-y | Co x | M y | | | | | | | | | |
| Example 1 | 1.03 | 0.88 | 0.09 | 0.03 | 10.0 | 750 | 0.992 | 0.82 | 0.10 | 0.011 | ⊚ | 212 | 97 |
| Example 2 | 1.04 | 0.72 | 0.25 | 0.03 | 10.0 | 750 | 0.993 | 0.81 | 0.11 | 0.012 | ⊚ | 176 | 98 |
| Example 3 | 1.02 | 0.92 | 0.05 | 0.03 | 10.0 | 750 | 0.991 | 0.83 | 0.13 | 0.010 | ⊚ | 220 | 96 |
| Example 4 | 1.03 | 0.88 | 0.09 | 0.03 | 0.7 | 750 | 0.983 | 0.41 | 0.10 | 0.011 | ⊚ | 205 | 89 |
| Example 5 | 1.03 | 0.88 | 0.09 | 0.03 | 1.5 | 750 | 0.984 | 0.53 | 0.11 | 0.012 | ⊚ | 207 | 92 |
| Example 6 | 1.03 | 0.88 | 0.09 | 0.03 | 5.0 | 750 | 0.988 | 0.62 | 0.10 | 0.013 | ⊚ | 211 | 94 |
| Example 7 | 1.03 | 0.88 | 0.09 | 0.03 | 15.0 | 750 | 0.996 | 0.94 | 0.12 | 0.012 | ⊚ | 209 | 95 |
| Example 8 | 1.03 | 0.88 | 0.09 | 0.03 | 16.0 | 750 | 1.001 | 1.1 | 0.11 | 0.010 | ⊚ | 209 | 91 |
| Example 9 | 1.03 | 0.88 | 0.09 | 0.03 | 10.0 | 100 | 0.985 | 0.46 | 0.08 | 0.009 | ⊚ | 206 | 92 |
| Example 10 | 1.03 | 0.88 | 0.09 | 0.03 | 10.0 | 375 | 0.986 | 0.62 | 0.08 | 0.009 | ⊚ | 207 | 94 |
| Example 11 | 1.03 | 0.88 | 0.09 | 0.03 | 10.0 | 1500 | 0.995 | 0.92 | 0.17 | 0.016 | ⊚ | 212 | 96 |
| Example 12 | 1.03 | 0.88 | 0.09 | 0.03 | 10.0 | 3000 | 1.004 | 1.2 | 0.28 | 0.022 | ○ | 207 | 91 |
| Comparative Example 1 | 1.03 | 0.88 | 0.09 | 0.03 | — | — | (1.03) | 0.69 | 1.06 | 0.15 | × | 200 | 96 |
| Comparative Example 2 | 1.03 | 0.88 | 0.09 | 0.03 | 0 | 750 | 0.976 | 0.16 | 0.11 | 0.012 | ⊚ | 202 | 83 |
| Comparative Example 3 | 1.03 | 0.88 | 0.09 | 0.03 | 0 | 1500 | 0.978 | 0.18 | 0.09 | 0.010 | ⊚ | 203 | 81 |

As is obvious in Table 1, the positive electrode active materials obtained in Examples had lithium carbonate contents of 0.4% by mass or more and 1.5% by mass or less, lithium hydroxide contents of 0.2% by mass or less, and sulfate group contents of 0.05% by mass or less. Thus, gelling of pastes obtained by kneading these positive electrode active materials was suppressed. Also, these positive electrode active materials were found to have high weather resistance, since they showed discharge capacity retention rates of more than 85% through a weather resistance test.

On the other hand, the positive electrode active material obtained in Comparative Example 1 had high lithium hydroxide and sulfate group contents, since it was not cleaned with an aqueous lithium carbonate solution. Thus, a paste obtained by kneading this positive electrode active material was observed to be gelled, and this positive electrode active material can be said to have had lower battery performance than those of Examples.

The positive electrode active materials obtained in Comparative Examples 2 and 3 had lithium carbonate contents of less than 0.4% by mass, since they were cleaned with pure water in place of an aqueous lithium carbonate solution. For this reason, these positive electrode active materials showed lower discharge capacity retention rates than those of Examples through a weather resistance test.

The above results reveal that if the positive electrode active materials obtained using the positive electrode active material production method of the present embodiment are used as the positive electrode materials of secondary batteries, gelling of positive electrode mixture material pastes obtained by kneading those positive electrode active materials is able to be suppressed and the secondary batteries would have high weather resistance. These results also reveal that the positive electrode active material of the present embodiment is useful as the positive electrode active materials of nonaqueous electrolyte secondary batteries.

INDUSTRIAL APPLICABILITY

Nonaqueous electrolyte secondary batteries having positive electrode active materials obtained according to the present invention in positive electrodes are able to be suitably used as power supplies for small portable electronic devices (notebook personal computers, mobile phone terminals, etc.), which are always required to have a high capacity, as well as are able to be used as batteries for electric vehicles, which are required to produce high output.

Also, nonaqueous electrolyte secondary batteries of the present invention have high safety and are able to be downsized and to produce high output and therefore are able to be suitably used as power supplies for electric vehicles, whose mounting space is limited. Also, nonaqueous electrolyte secondary batteries of the present invention are able to be used not only as power supplies for electric vehicles, which are driven purely by electric energy, but also as power supplies for so-called "hybrid vehicles," which use also a combustion engine such as a gasoline engine or diesel engine.

The contents of Japanese Patent Application No. 2015-167529 and all documents cited in the above embodiment or the like are incorporated herein by reference as a part of the present description to the extent permitted by law.

DESCRIPTION OF REFERENCE SIGNS

BA . . . evaluation coin battery
1 . . . lithium metal negative electrode
2 . . . separator (impregnated with electrolyte solution)
3 . . . positive electrode (evaluation electrode)
4 . . . gasket
5 . . . negative electrode can
6 . . . positive electrode can
7 . . . current collector

The invention claimed is:

1. A method for producing a positive electrode active material for nonaqueous electrolyte secondary batteries, the method comprising:
cleaning a powder formed of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al with an aqueous lithium carbonate solution; and
drying the cleaned powder.

2. The method for producing the positive electrode active material for nonaqueous electrolyte secondary batteries of claim 1, wherein a concentration of the aqueous lithium carbonate solution is 0.5 g/L or more and 16.0 g/L or less.

3. The method for producing the positive electrode active material for nonaqueous electrolyte secondary batteries of claim 1, wherein the cleaning comprises cleaning the powder in a state in which a concentration of a slurry of the aqueous lithium carbonate solution containing the powder is 100 g/L or more and 3000 g/L or less.

* * * * *